May 10, 1966
H. M. BELL ET AL
3,250,442
DISPOSABLE GREASE CARTRIDGE
Filed Feb. 27, 1964
2 Sheets-Sheet 1
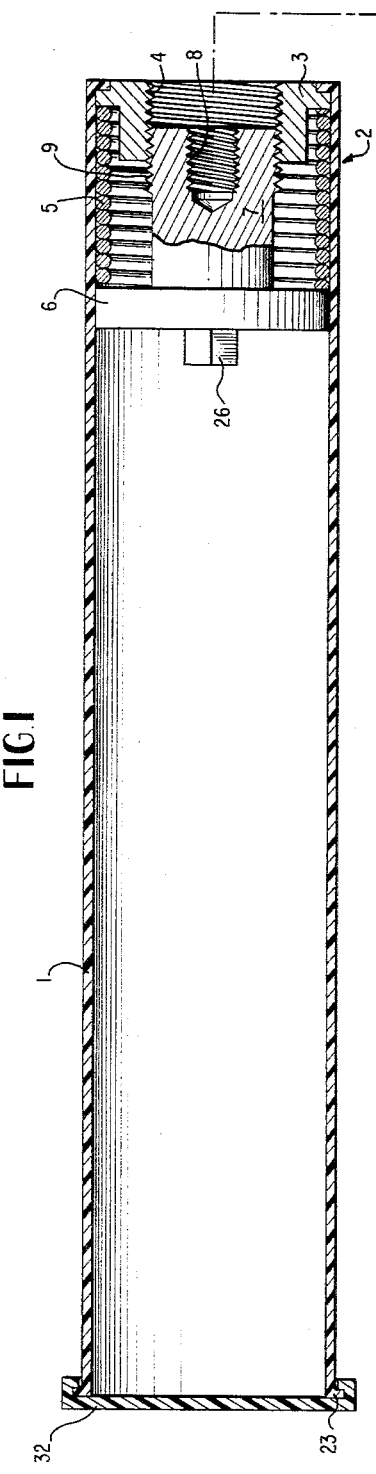
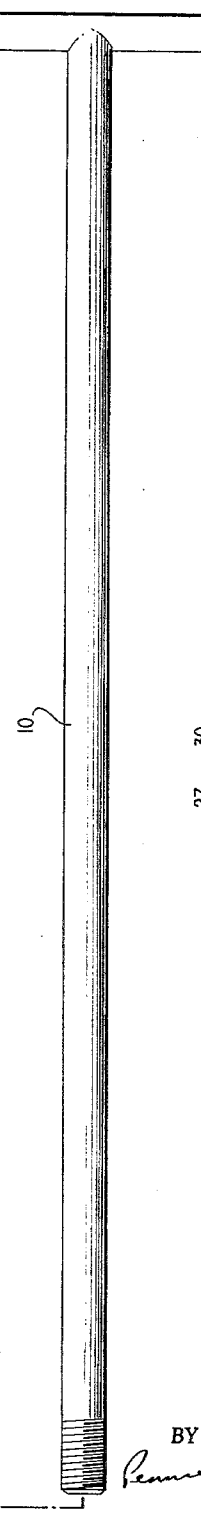
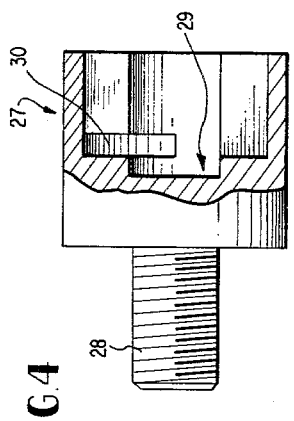
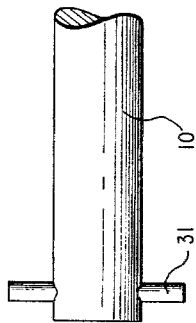
INVENTORS
HUGH M. BELL
BY HOWARD A. WOODRUFF
ATTORNEY

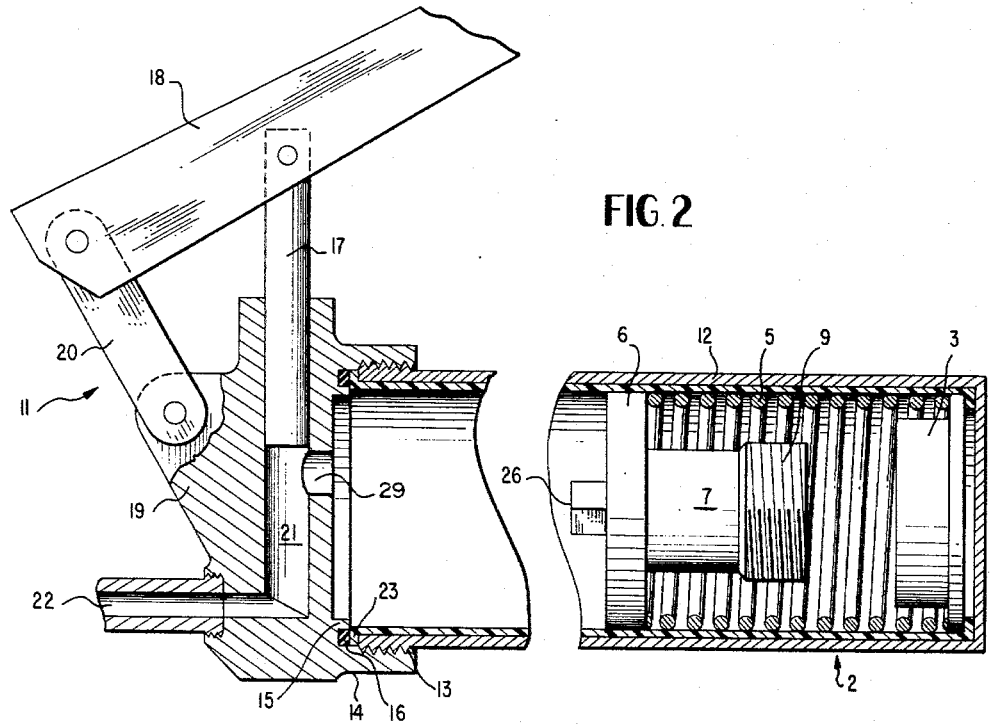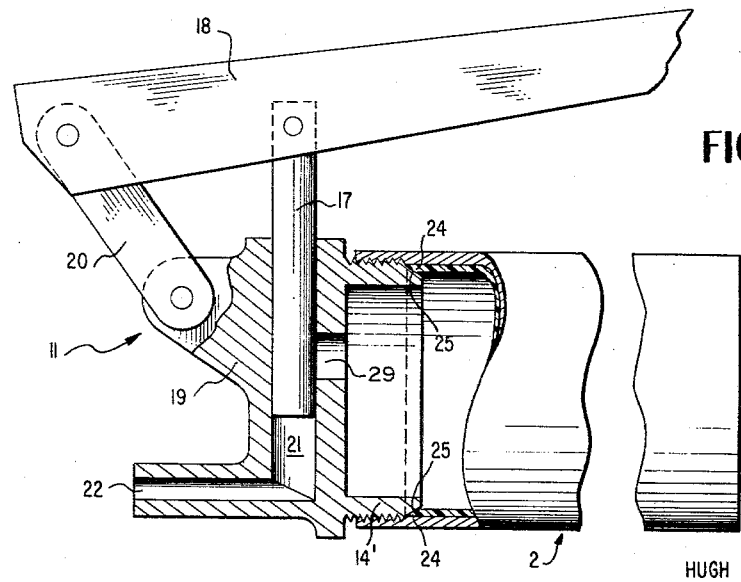

3,250,442
DISPOSABLE GREASE CARTRIDGE
Hugh Micheal Bell, 628 Ashton St., New Iberia, La., and Howard A. Woodruff, 7910 Homer Drive, Beaumont, Tex.
Filed Feb. 27, 1964, Ser. No. 347,859
11 Claims. (Cl. 222—327)

This invention relates generally to a grease cartridge, and more particularly to an improved disposable grease cartridge assembly for use in standard grease guns.

Ordinarily, grease is applied by pressure applicators requiring special pumps attached thereto for transferring grease material from bulk containers to the gun nozzle. Such applicators have numerous disadvantages, among which is a limited range of operability due to their immobile and cumbersome design. Further, since bulk containers are required to supply the applicators, the possibility of foreign matter, such as dirt and grit, entering the grease and being deposited along with the grease upon bearings or other moving parts of machinery to be lubricated, is always present.

In addition to the above-described pressure applicators, grease guns adapted to receive and to operate with grease cartridges inserted therein are known. However, such cartridges have been so designed that the spilling and wasting of grease has resulted, since the cartridge has not been sealed at the plunger end until after it is placed in the barrel of the grease gun. Additionally, it has been found that constant reuse of the same spring in the gun assembly gradually results in a decrease in efficiency of the gun operation, since some grease tends to remain within the cartridge after the spring has been expanded.

This invention contemplates a novel disposable spring-included grease cartridge and assembly, which is adapted to contain and dispense a predetermined amount of grease encased therein, ready for immediate insertion and use within a standard grease gun applicator.

More specifically, this present invention contemplates a novel cartridge and cartridge assembly comprising a plastic casing having a disc assembly including a sealing disc, a plunger disc and an activating spring disposed therebetween, all located within the casing. A sealing means is arranged on the plastic casing at its forward end for providing intimate contact between the plastic cartridge and the grease gun head. A plunger rod is inserted within the disc assembly (with or without a plunger adapter) for unlocking the disc assembly when compression is required to force the grease encased within the cartridge to the gun nozzle. In such an arrangement, the cartridge is at once disposable after being emptied, and is thus commercially attractive, since it may be sold, shipped and used simply and conveniently, without any handling of grease.

This invention will be further described in connection with the accompanying drawings, in which:

FIG. 1 is a detailed cross-sectional view of the novel cartridge assembly;

FIG. 2 is a detailed cross-sectional view of the cartridge in a sealing arrangement with a grease gun head;

FIG. 3 is a detailed cross-sectional view of the cartridge in a modified sealing arrangement with a grease gun head;

FIG. 4 is a detailed cross-sectional view of the plunger adapter; and,

FIG. 5 is a detailed view of the modified plunger rod.

Referring to the drawings, the invention is embodied in a spring-loaded grease cartridge assembly comprising a casing 1, a disc assembly, generally indicated by 2, comprising a rear apertured sealing disc 3 attached to the casing 1 at one end and containing interior right-hand threads 4, a compressible spring 5 and a plunger disc 6 binding against the inside portion of the sealing disc 3 when the spring 5 is fully compressed. Extending from the rear face of the plunger disc 6 is a hollow threaded boss 7 containing outside threads 9 for engagement within sealing disc 3 and also containing inner threads 8 into which an elongated plunger rod 10 is threaded for unlocking the disc assembly when it is in its compressed state.

The grease gun generally indicated by 11, as illustrated in FIG. 2, comprises an outer barrel 12 threaded at 13 into a rearward extending circular gun head flange 14. Located within the outer head flange 14 is an inner circular gun head flange 15 with a permanent pump head gasket 16 disposed therebetween. A vertical plunger 17 is attached at its upper end to a handle 18 which is anchored to the gun head 19 by support 20. The lower end of plunger 17 is slidable vertically within the gun head 19 through chamber 21 leading to grease outlet 22.

A sealing means, consisting either of the outer edge 23 (as shown in FIG. 2) or the beveled edge 25 (as shown in FIG. 3) is disposed at the forward end of casing 1 for providing intimate contact to prevent the possibility of grease leakage between the sides of the casing 1 and the grease gun head 19 once the cartridge 1 is inserted into the gun 11.

The outer edge sealing means comprises a plastic lip 23 extending around the total periphery of the casing 1 at its forward edge. Once the cartridge 1 is inserted within the outer barrel 12 and the outer barrel is in threaded attachment with the outer head flange 14, the plastic lip 23 will be compressed between the edge of the outer barrel 12 and both the gasket 16 and outer peripheral edge of the inner head flange 15 with the result that an intimate sealing arrangement will be accomplished.

In the modified beveled seal as shown in FIG. 3, the extreme inner end 24 of the forward end of the cartridge 1 is beveled. Correspondingly, the outer peripheral edge 25 of the head flange 14' is beveled so that it will fit snugly against the beveled edge 24 of casing 1 when the outer barrel 12 is threaded around the head flange 14'.

A square cut projection 26 extends outwardly from the forward face of the plunger disc 6. This projection is so designed so that the plunger disc boss 7 may be easily actuated and also threadedly locked within the sealing disc 3 prior to the casing 1 being filled with grease. This may be accomplished by inserting a wrench (not shown) through the forward end of the casing 1 after the cap 32 has been removed. The wrench is then placed around the square cut projection 26 to limit or prevent the rotation of the plunger disc boss 7 as the sealing disc 3 is threaded around the disc boss 7 for locking engagement therewith.

The cartridge is in condition for sale or delivery when it is full of grease and sealed at its forward end by cap 32, as shown in FIG. 1. In this arrangement, the plunger disc boss 7 is threaded within the sealing disc 3 with the spring 5 fully compressed.

When it is so desired to insert the cartridge 1 into the grease gun, the sealing cap 32 is removed and the cartridge 1 is placed in engagement with the gun head 19. The outer barrel 12 is then screwed into the gun head 19 until the sealing lip 23 is compressed therebetween. After the plunger rod 10 is inserted and screwed into the interior threads 8 of the plunger disc 6, a further clockwise twisting of the plunger rod 10 will cause the plunger disc 6 to unscrew and detach from the sealing disc 3 (all threads being clockwise). The spring 5 will thus decompress, forcing the plunger disc 6 against the grease within the casing 1. When it is desired to expel the grease from within the cartridge 1, the grease gun 11 is opened by raising the gun handle 18 until the plunger 17 is lifted above the gun head inlet 29. The grease will then be forced from within the casing 1 by the plunger disc 6, into chamber 21 and out of the grease gun outlet 22.

The adapter 27 (shown in FIG. 4) may be attached to the disc assembly 2 and thus provide an additional method for releasing the spring 5 when it is in a compressed condition. One end of the adapter 27 is provided with threads 28 for insertion into the inner threads of the hollow boss 7 of the plunger disc 6 while its other end is provided with a hollow bore 29 containing slots 30. Correspondingly, the elongated plunger rod 10 is designed with a key or pin 31 at one extreme end (as shown in FIG. 5) so that it will fit within the hollow bore slots 30 of the adapter 27 for proper engagement. Thus, it can be seen that after the rod 10 is inserted with the bore slots 30 of the adapter 27, a slight clockwise turning of the plunger rod 10 will effectuate an unlocking of the disc assembly in the same manner as above mentioned.

To fill the casing with grease, a wrench (not shown) is first inserted within the forward end of the empty casing 1 and around the square cut projection 26. The spring 5 is then compressed against the sealing disc 3 and locked in this position by the screwing of the sealing disc's inner threads 4 around the outer threads 9 of plunger disc boss 7. Grease is then introduced within the empty portion of the casing 1 and a cap 32 is placed across the forward end of the casing 1 to seal the contents therein.

The casing of the cartridge 1 is preferably made of plastic but any other similar material may be utilized. Further, the dimensions of the casing 1 should be those of the inside dimensions of the grease gun barrel 12 into which it is encased. The rear sealing disc 3 is not detachable from the casing 1 and preferably should be of a greater thickness than the annular portion of the casing 1, since sufficient threads 4 must be cut into its apertured center to the hold the boss 7 of the plunger disc 6.

It is preferred that the plunger disc 6 and spring 5 take up a minimum amount of space within the casing 1 so that as much grease as possible may occupy its interior. Further, the spring 5 must be selected and designed with the proper number of convolutions so that the plunger disc 6, in its preferred embodiment, might travel the full length of the casing 1 thereby emptying its entire contents of grease after the spring has expanded fully.

Various modifications in the construction and arrangement of its parts as described herein may be made by those skilled in the art without departing from the scope of the appended claims.

We claim:
1. A disposable grease cartridge for use in standard grease hand-guns comprising:
   (a) a hollow thin wall cylindrical casing;
   (b) an apertured sealing disc being interiorly threaded and adapted to close the rear end of said casing;
   (c) a plunger disc disposed within the casing and in slidable peripheral contact therewith, said plunger containing a boss extending outward from its rear face, said boss being threaded for direct detachable engagement with said sealing disc;
   (d) a compressible spring interposed between said sealing disc and plunger disc; and
   (e) a narrow plastic lip disposed peripherally about said casing at its forward end.

2. The disposable grease cartridge of claim 1, wherein said casing in plastic.

3. The disposable grease cartridge of claim 2, wherein the plunger disc contains a square cut projection extending from its forward face.

4. The disposable grease cartridge for us in standard grease hand-guns, comprising:
   (a) a hollow thin wall cylindrical casing beveled peripherally about its inner forward edge;
   (b) an apertured sealing disc being interiorly threaded and adapted to close the rear end of said casing;
   (c) a plunger disc disposed within the casing and in slidable peripheral contact therewith, said plunger containing a boss extending outward from its rear face, said boss being threaded for direct detachable engagement with said sealing disc;
   (d) a compressible spring interposed between said sealing disc and plunger disc.

5. The disposable grease cartridge of claim 4, wherein said casing is plastic.

6. The disposable grease cartridge of claim 5, wherein the plunger disc contains a square cut projection extending from its forward face.

7. A disposable grease cartridge for use in standard grease hand-guns, comprising:
   (a) a hollow casing;
   (b) an apertured sealing disc being interiorly threaded and adapted to close the rear end of said casing;
   (c) a plunger disc disposed within the casing and in slidable peripheral contact therewith, said plunger containing a boss extending outwardly from its rear face, said boss being threaded for direct detachable engagement with said sealing disc;
   (d) a compressible spring interposed between said plunger disc and sealing disc; and
   (e) a means for providing sealing contact between said grease gun and said casing at its forward end.

8. The disposable grease cartridge of claim 7, wherein said casing is plastic.

9. The disposable grease cartridge of claim 8, wherein the plunger disc contains a square cut projection extending from its forward face.

10. A disposable grease cartridge assembly for use in standard grease hand-guns, comprising:
    (a) a hollow thin wall cylindrical casing;
    (b) an apertured sealing disc being interiorly threaded and adapted to close the rear end of said casing;
    (c) a plunger disc disposed within the casing and in slidable peripheral contact therewith, said plunger disc containing a hollow boss extending outward from its rear face, said boss having means for direct detachable engagement with said sealing disc comprising a slotted bore adaptor attachable within the hollow boss and a plunger rod adapted to fit into said slotted bore;
    (d) a compressible spring interposed between said plunger disc and sealing disc;
    (e) means for providing sealing contact between said casing at its forward end and with said grease gun; and
    (f) means for detachably connecting said plunger disc boss from said sealing disc.

11. The disposable grease cartridge according to claim 1 including in combination therewith a means for detachably connecting the hollow plunger disc boss from said sealing disc comprising a plunger rod adapted to be inserted within the hollow flange.

References Cited by the Examiner

UNITED STATES PATENTS

| | | | |
|---|---|---|---|
| Re. 15,675 | 8/1923 | Skelly | 222—386 X |
| 2,752,074 | 6/1956 | Martin | 222—326 |
| 2,759,640 | 8/1956 | Deupree | 222—326 |

ROBERT B. REEVES, *Primary Examiner.*

LOUIS J. DEMBO, *Examiner.*

A. KNOWLES, *Assistant Examiner.*